H. S. PIERCE.
EQUALIZING WHEEL FOR CHAIN OR ROPE DRIVES.
APPLICATION FILED JAN. 18, 1913.
1,148,190.
Patented July 27, 1915.
4 SHEETS—SHEET 1.
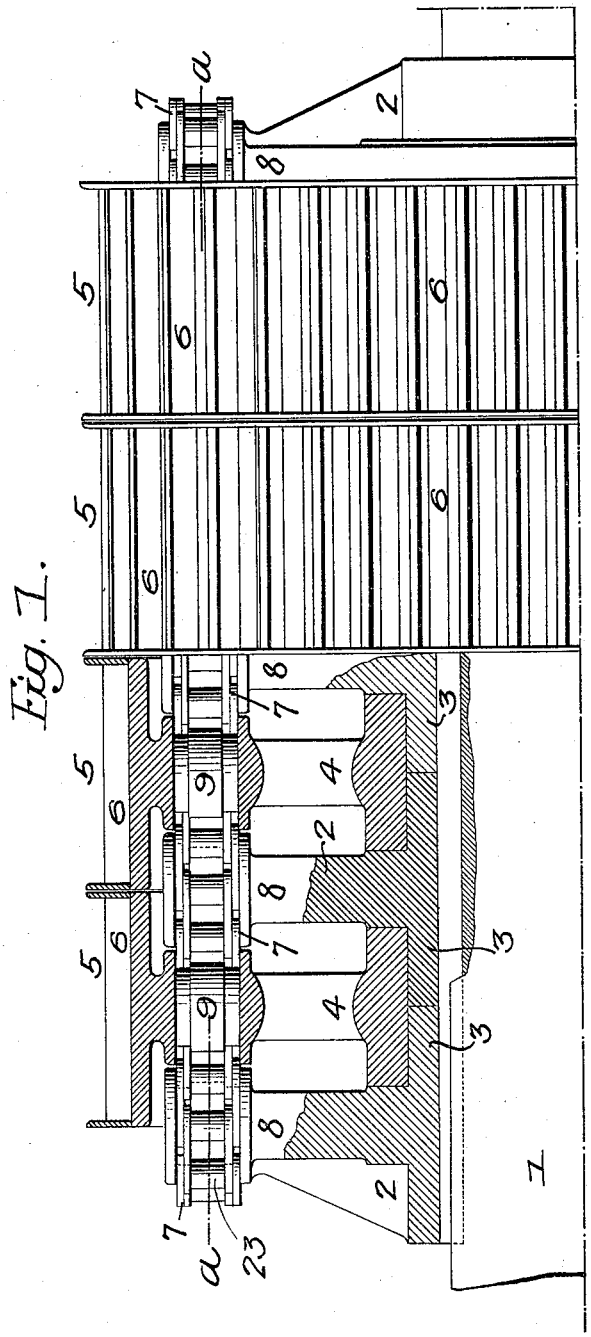
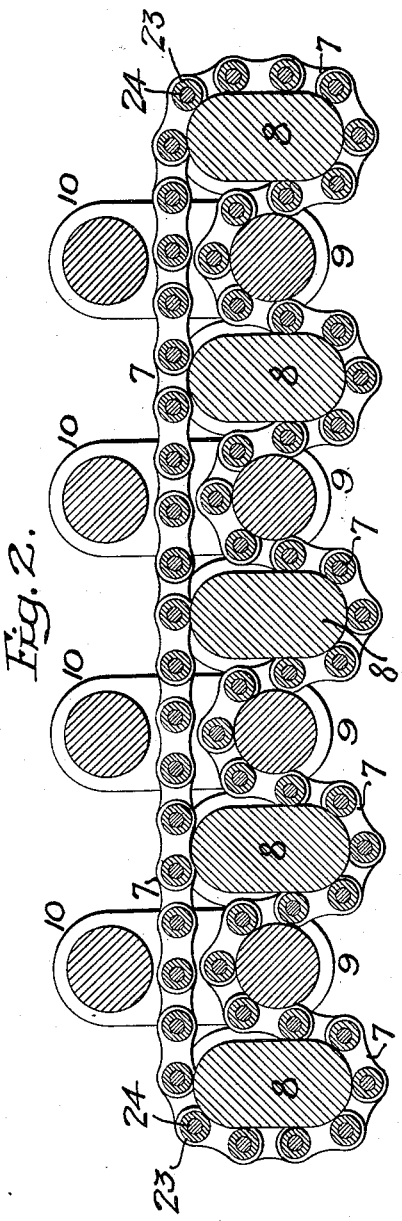
Witnesses.—
Inventor-
Harold S. Pierce.
by his Attorneys
Howson & Howson H. S. PIERCE.
EQUALIZING WHEEL FOR CHAIN OR ROPE DRIVES.
APPLICATION FILED JAN. 18, 1913.
1,148,190.
Patented July 27, 1915.
4 SHEETS—SHEET 2.
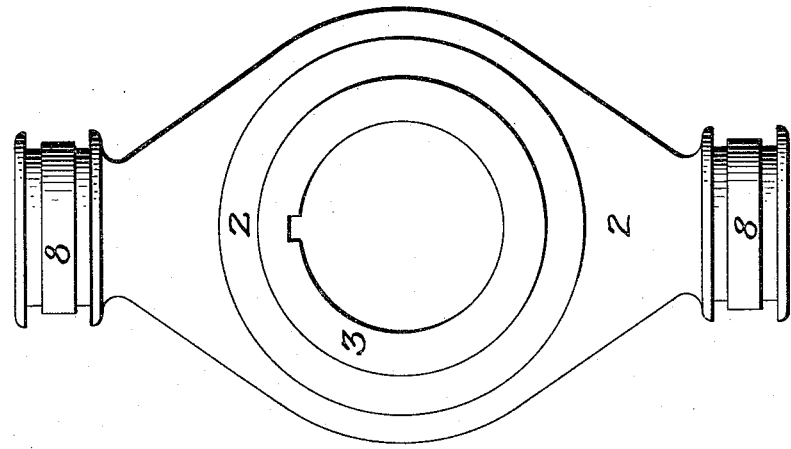
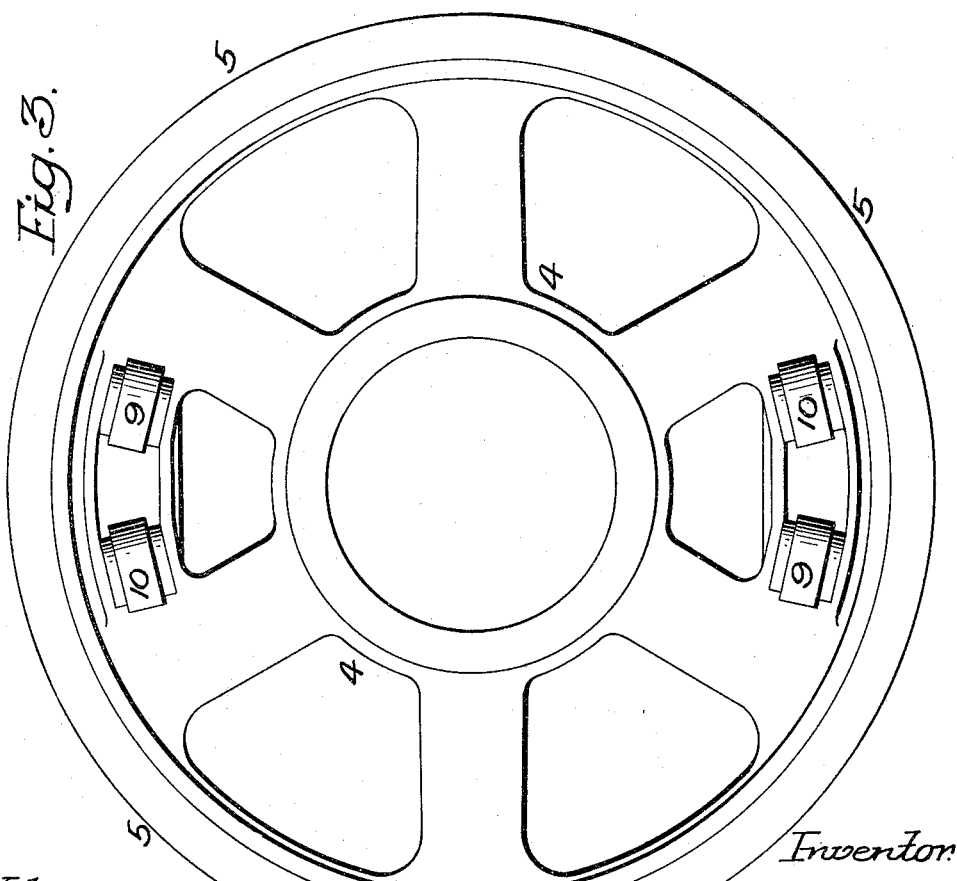

H. S. PIERCE.
EQUALIZING WHEEL FOR CHAIN OR ROPE DRIVES.
APPLICATION FILED JAN. 18, 1913.
1,148,190.
Patented July 27, 1915.
4 SHEETS—SHEET 3.
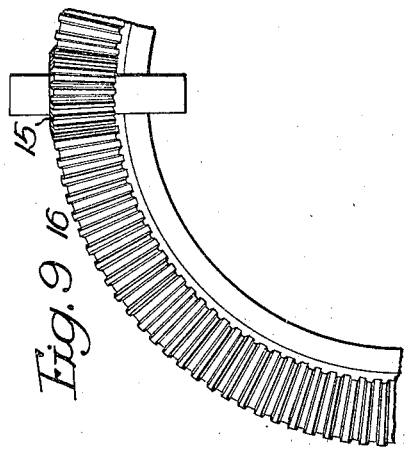
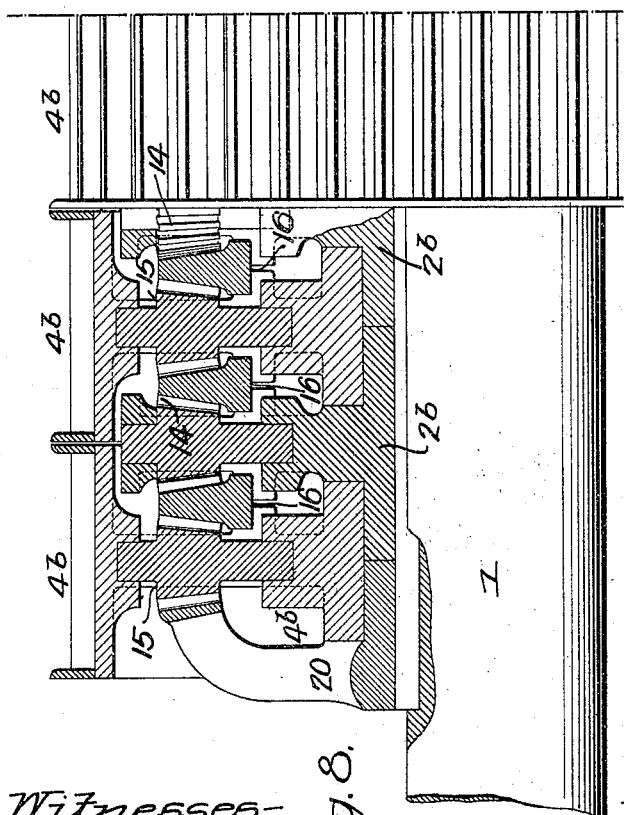
Witnesses
Inventor
Harold S. Pierce
by his Attorneys
Howson & Howson H. S. PIERCE.
EQUALIZING WHEEL FOR CHAIN OR ROPE DRIVES.
APPLICATION FILED JAN. 18, 1913.
1,148,190.
Patented July 27, 1915.
4 SHEETS—SHEET 4.
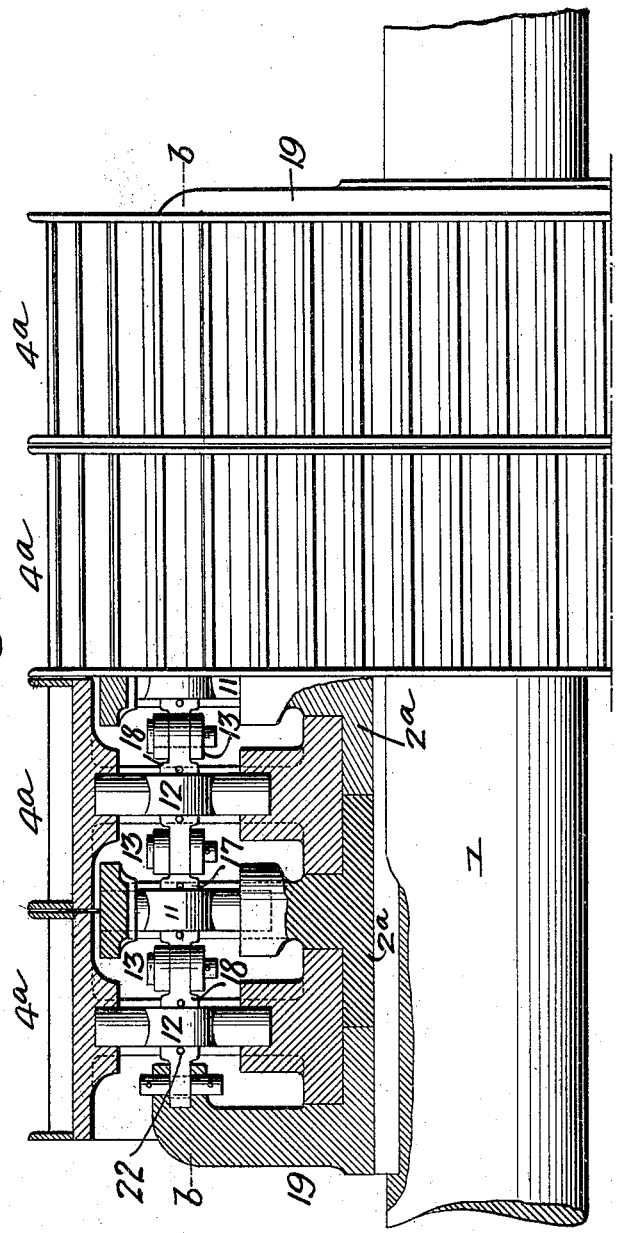
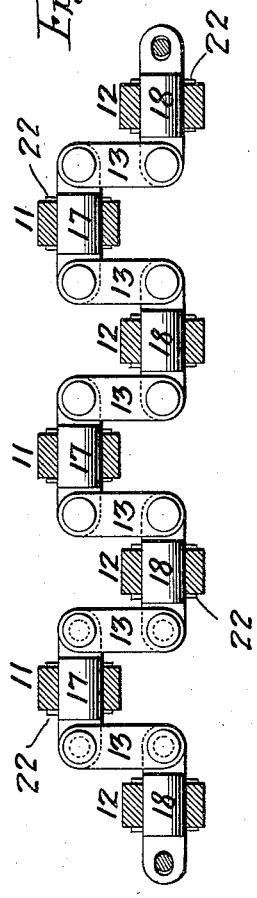
Witnesses—
Inventor—
Harold S. Pierce,
by his Attorneys
Howson & Howson the teeth or projections of the circular flange on the sheave element is of such width as to enter between two of the rollers of the chain and of such curvature as to properly engage the rollers.

UNITED STATES PATENT OFFICE.

HAROLD S. PIERCE, OF PHILADELPHIA, PENNSYLVANIA, ASSIGNOR TO LINK-BELT COMPANY, OF CHICAGO, ILLINOIS, A CORPORATION OF ILLINOIS.

EQUALIZING-WHEEL FOR CHAIN OR ROPE DRIVES.

1,148,190.  Specification of Letters Patent.  Patented July 27, 1915.

Application filed January 18, 1913. Serial No. 742,886.

*To all whom it may concern:*

Be it known that I, HAROLD S. PIERCE, a citizen of the United States, residing in Philadelphia, Pennsylvania, have invented certain Improvements in Equalizing-Wheels for Chain or Rope Drives, of which the following is a specification.

The object of my invention is to provide an equalizing gear which will equalize the strain upon the independent chains of a chain drive, yet will not interfere with the proper transmission of power and which will be contained within the sheaves or wheels around which the chains pass. This object I attain in the following manner, reference being had to the accompanying drawings, in which:—

Figure 1 is a sectional view through one-half of a wheel of a chain drive, illustrating my invention; Fig. 2 is a sectional plan view on the line *a*—*a*, Fig. 1; Fig. 3 is a side view of one of the sheave elements; Fig. 4 is a side view of one of the hub elements; Fig. 5 is a sectional plan view illustrating a modification of the arrangement shown in Fig. 2; Fig. 6 is a sectional view illustrating a modification in which a series of links are substituted for the chain illustrated in Figs. 1 and 2; Fig. 7 is a sectional plan view on the line *b*—*b*, Fig. 6; Fig. 8 is a sectional view illustrating another modification in which gears are substituted for the chains illustrated in Figs. 1 and 2; and Fig. 9 is a view showing a portion of the gear ring and pinion.

Referring to Figs. 1 to 4 inclusive, 1 is a shaft on which are secured the hub elements 2. The hubs of these elements, in the present instance, are extended so as to abut one another and mounted on the hubs 3 of the elements are the sheave elements 4, having the extended rims 5 with flanges at each edge, as illustrated in Fig. 1. These rims are preferably of such a width that they will be close together when the parts are assembled on the shaft 1. These rims, in the present instance, have sprocket teeth 6 with which engage the teeth on the independent drive chains which pass around the several sheave elements and which transmit the power from one shaft to another. It is impossible to commercially make a drive chain of a number of links so that one chain will be of the same length as another, consequently, when a series of these chains are placed side by side for the purpose of transmitting power from one shaft to another, some suitable equalizing gear is necessary to compensate for the difference in length of the several chains and when a chain is repaired the new section will not be of the same length as the old portion so that a compensating gear should be used to equalize the strains.

The main object of this invention is to provide an equalizing gear which will be substantial and effective and which is located wholly within one of the wheels around which the chains pass.

As shown in Figs. 1 to 4 inclusive, on each hub element is a bearing 8 and on each sheave element are two bearings 9 and 10, spaced a given distance apart, as illustrated in Fig. 2. 7 is an endless chain, in the present instance, which passes in front of the several bearings 8 on the hub element 2 and back of each bearing 9 on the sheave element 4. The return run of the chain passes back of all of the bearings 8 and between the bearings 9 and 10 of the sheave elements. As the sheave elements are loose on the shaft 1, it will be seen that if one drive chain is slightly shorter than the others, the equalizing gear will allow that particular sheave element to move so as to slacken the endless equalizing chain and this slack will be immediately taken up by the movement of the other sheave elements so that the tension on all of the independent drive chains will be equal. If the direction of movement of the drive is reversed, then the bearings 10 act to take up the slack in the endless equalizing chain, while the bearings 9 are moved out of operative position. The bearings 9, in some instances, may be in the form of rollers and, in fact, the bearings 8 may be round and in the form of rollers instead of oblong, but I prefer the construction illustrated in the drawings.

The chain shown in the drawings has rollers 23 at the pivots 24 and the links are of greater width than the rollers. Each of the bearings 8, 9 and 10 is grooved to receive the links and this allows the rollers to rest upon the broad surface between the grooves, as shown in Fig. 1, the chain being retained in position.

In Fig. 5, I have illustrated the simplest form of my improvement, namely, a series of bearings $8^a$ on the hub elements alternating with a series of bearings $9^a$ on the sheave elements, with a chain $7^a$ threaded around the two series of bearings; the ends of the chain being secured, in the present instance, to arms 21 on the shaft, but the ends of the chain may be secured to the sheave elements, gaining the same result.

While I have described the equalizing device as a chain, it will be understood that a rope or other flexible means may be used instead of the chain.

In Figs. 6 and 7, I have illustrated a modification of my invention in which a series of levers and links are substituted for the chain. In this construction, the hub elements $2^a$ are secured to the shaft and mounted in bearings in these elements are swivels 11 and extending through openings in the swivels 11 are bars 17 which form levers. The rim elements $4^a$ are mounted on the hub of the elements $2^a$, in the present instance, and pivotally mounted on the elements $4^a$ are swivels 12. Extending through openings in the swivels are bars 18 which form levers. The bars 17 and 18 are held from moving longitudinally in their swivels by pins 22, as shown, but are free to turn. The lever bars 17 and 18 are alternately arranged, and are connected by links 13, as shown, so that any movement of one of the sheave elements $4^a$ will be transmitted to the other sheave elements and the strain equalized. The end levers 18 are attached to elements 19 fixed on the shaft in the construction shown.

In Figs. 8 and 9, I have illustrated a modification in which gearing is used as the equalizing mechanism in place of the chains illustrated in Figs. 1 and 2.

In bearings in each of the hub elements $2^b$ are mounted a series of bevel gears 14, which are free to rotate and on the sheave elements $4^b$ are a series of bevel gears 15, which are also free to rotate in the said elements and mounted between the several bevel gears are rings 16 having beveled teeth forming annular racks with which mesh the wheels 14 and 15. These annular racks are carried, in the present instance by shoulders formed on the elements $2^b$ and $4^b$ so that they will always mesh with the gear wheels. The end racks 20 are fixed to the shaft 1. Thus any movement imparted to any one of the sheave elements $4^b$ will be transmitted to the other sheave elements through the gearing above described.

My invention can be used when two chains are placed side by side, but it is particularly adapted for drives in which more than two chains are placed side by side and the number of chains may be increased or decreased by merely adding extra elements and lengthening the compensating chain or increasing the number of levers and links or vice versa.

I claim:

1. The combination in an equalizing gear, of a shaft; a series of hub elements secured to the shaft; a series of sheave elements alternating with the hub elements and loose in respect to the shaft; and means connecting the hub elements and the sheave elements so that, when any one of the sheave elements is subjected to an uneven strain, the strain will be distributed throughout the series and the power will be transmitted through the several hub elements from or to the shaft.

2. The combination of a shaft; a series of hub sections thereon; a series of sheave sections alternating with the hub sections; bearings on the hub sections; and bearings on the sheave sections; with a compensating chain threaded around the said elements.

3. The combination of a shaft; a series of hub elements secured to the shaft; a series of sheave elements mounted between the hub elements and adapted to have a movement independent of the hub elements; each of said hub elements having a bearing and each of the sheave elements having a bearing; and an endless chain extending around the several bearings and acting as a compensating connection between the several elements.

4. The combination of a shaft; hub elements mounted loosely on the shaft; sheave elements alternating with the hub elements; a single bearing on each hub element and two bearings on each sheave element; an endless chain passing between the two bearings on the sheave element and on each side of the bearings on the hub element so that when the shaft is turned in one direction, one set of bearings on the sheave element will rest against the chain and when the shaft is rotating in the reverse direction, the other bearing of the sheave element will rest against the chain.

5. The combination of a shaft; a series of hub sections thereon; a series of sheave sections alternating with the hub sections; grooved bearings on the hub sections; grooved bearings on the sheave sections; with a compensating chain threaded between the said bearings; said chain being made of links connected by pivot pins; and rollers on the pivot pins less in diameter than the width of the links, the links of the chain resting in the grooves of the bearings, thus holding the chain in position.

6. The combination of a shaft; a series of hub elements thereon; a series of three or more loose sheave elements placed side by side and overlapping the hub elements; and a single means connecting the said elements so that the movement of one of the sheave elements will affect the position of the other sheave elements of the series.

In testimony whereof, I have signed my name to this specification, in the presence of two subscribing witnesses.

HAROLD S. PIERCE.

Witnesses:
WM. E. SHUPE,
WM. A. BARR.